Patented July 4, 1950

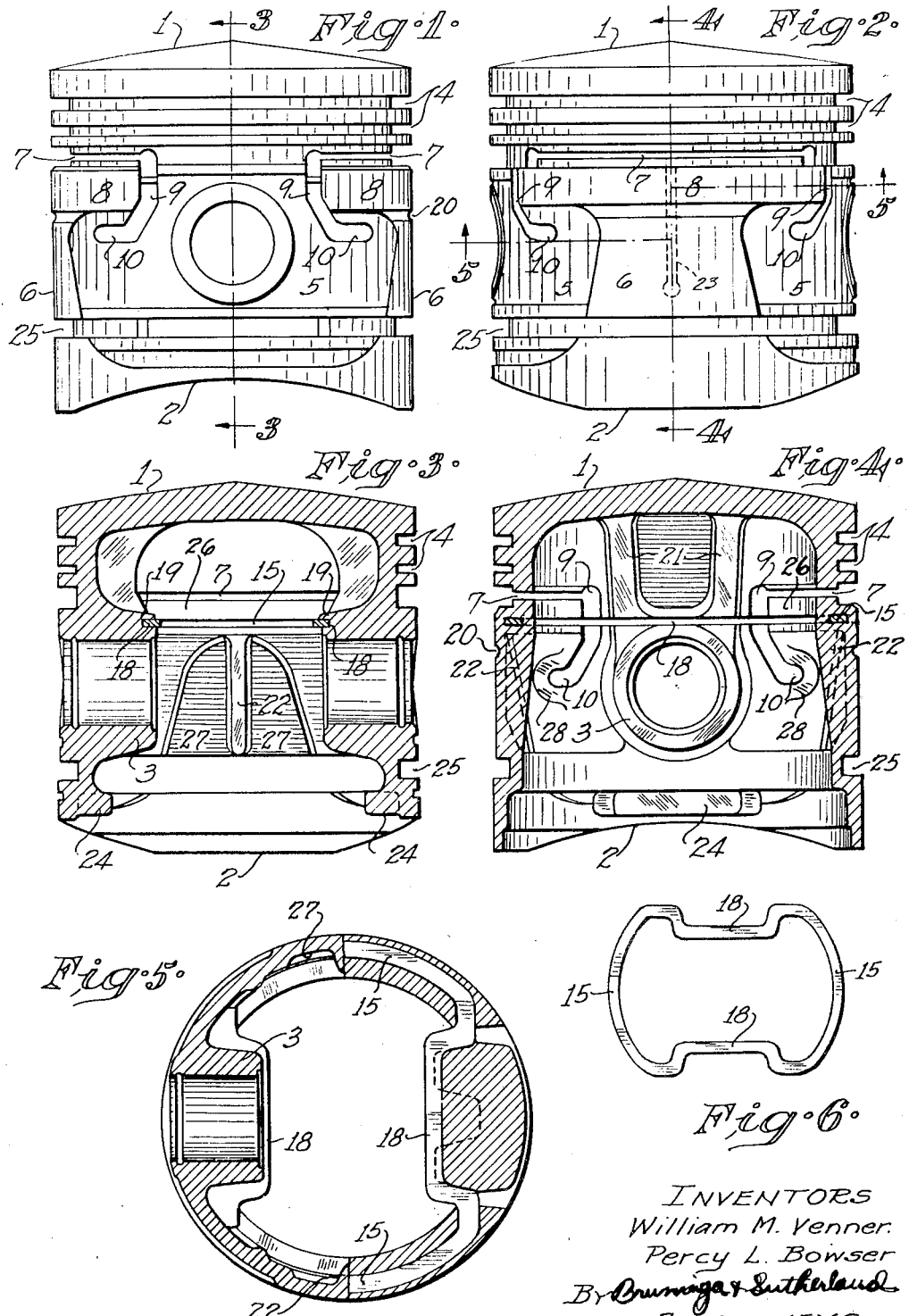

2,513,437

UNITED STATES PATENT OFFICE 2,513,437

PISTON

William M. Venner, Clayton, and Percy L. Bowser, University City, Mo.

Application October 5, 1945, Serial No. 620,572

12 Claims. (Cl. 309—13)

This invention relates to pistons, particularly those designed for internal combustion engines, and more particularly to pistons of the trunk type made of light metal such as aluminum or magnesium or the alloys thereof.

One of the objects of this invention is to provide a piston of the character described, in which the piston is so constructed and controlled as to its expansion that the cylinder-bearing part or parts, namely the thrust face or faces, may be finished to substantially a true circular shape corresponding to that of the cylinder and still maintain a good bearing fit at the varying engine temperatures.

Further objects will appear from the following description in which will be set forth illustrative embodiments of this invention; it is to be understood, however, that this invention is susceptible of various embodiments, within the scope of the appended claims, without departing from the principles or spirit of this invention.

In the drawings, Figure 1 is a side elevation taken at the region of one of the bosses and illustrating an embodiment of this invention;

Figure 2 is a side elevation taken at right angles to Figure 1;

Figure 3 is a section on the line 3—3 of Figure 1;

Figure 4 is a section on the line 4—4 of Figure 2;

Figure 5 is a section on the line 5—5 of Figure 2.

Figure 6 is a detail of the control element.

We will assume here that the cylinder, in which the piston embodying this invention is particularly designed to operate, is an internal combustion engine cylinder made of cast iron or steel having a relatively low coefficient of expansion, and that the piston is made of aluminum or magnesium or one of the alloys thereof. Thus, in the case of the aluminum alloy, it may be an aluminum-copper alloy or an aluminum-silicon alloy, the alloy also containing other alloying components such as magnesium, nickel, or manganese, or all of them. Such a piston will, of course, have a coefficient of expansion materially greater than that of the cylinder in which it operates. Furthermore, the cylinder may be subject to distortion or uneven expansion, particularly under abnormal operating conditions.

Generally stated and in accordance with one of the embodiments of this invention, a trunk piston of the character described comprises a head, a skirt, and wrist pin bosses connected with the head and the skirt. A thrust face or faces is or are partially separated from the head; the construction is however such as to permit flexing of the thrust face or faces at their upper parts relative to the remainder thereof. Means is provided including a rigid element or elements extending and embedded circumferentially along the upper part of the thrust face or faces, adapted to maintain the curvature or curvatures thereof at varying engine temperatures. This means may also include provisions extending from such an element to the opposing thrust face, or connecting the corresponding ends of the elements, adapted to maintain the radius of the upper part or parts of the element-embedded thrust face or faces at varying engine temperatures to the cylinder radius or diameter. The element or elements described here as "rigid," are sufficiently so that under normal operating temperatures they will not flex circumferentially. The element or elements have or may have a coefficient of expansion materially less than that of the thrust face or faces, and the provisions connecting the element or elements with the opposing thrust face have a coefficient of expansion corresponding to that of the element or elements.

Referring now to the accompanying drawings, 1 designates the head of the piston, 2 designates the skirt provided with wrist pin bosses 3. The head is, as usual, reduced diametrically with respect to the skirt and is provided with the usual grooves 4 for receiving the piston rings. The skirt is depressed in the regions of the bosses, as shown at 5, with respect to the thrust face 6. One or both of the thrust faces are separated from the head by a part-circumferential slot 7, which may be in the lower ring groove.

The depressed part 5 may extend underneath the upper part or parts 8 of the thrust face so as to provide what may be called "wings." At the terminals of the circumferential slot there may be provided slots 9 extending downwardly, and these slots may extend laterally toward the middle of the thrust face and underneath the wings 8, as shown at 10, so as to provide retrograde slots. The structure is therefore such that the thrust face is constructed to flex at its upper part relative to the remainder thereof. As shown, this structure is provided on both thrust faces, although that may not be necessary under certain conditions.

The thrust face has extending and embedded circumferentially along the upper part thereof a rigid element 15. This element is made of a material whose coefficient of expansion is materially less than that of the thrust face, and this coefficient may be equal to, slightly less, or slightly greater than that of the material of which the engine cylinder is made. A suitable material is ordinary steel, although a special steel having a low coefficient of expansion may be employed. The element is designed to be rigid so that when embedded in the upper part of the thrust face there will be no circumferential bending of either the element or of the upper part of the thrust face during the normal operating temperatures. This can be accomplished in, for instance, a cylinder of $3\frac{3}{16}$ inches diameter by providing the element 15, when of cold rolled steel, about 0.07 inch in thickness and about 0.156 inch in radial depth. It will be understood that the element may, as shown, be provided in both thrust faces, although under certain conditions that may not be necessary.

The element 15 in one thrust face is connected to the opposing thrust face by means adapted to maintain the radius of the upper part of the element-embedded face at varying engine temperatures to the cylinder radius. In the particular embodiment described where the element is provided in both thrust faces, a pair of members 18 connect the corresponding ends of the elements to secure that result. These members 18 may be integral with the elements 15 and of the same material and so that they have a coefficient of expansion corresponding to that of the cylinder material. Where the thickness of the member 18 is that of the element 15, then its width, in the piston construction shown, may be the same. These members form tension elements, as distinguished from struts, so as to restrain diametric expansion of the upper parts of the thrust faces at varying engine temperatures to maintain the thrust faces at the cylinder radius. For, since these members have practically the same rate of expansion as the cylinder, and the piston temperature varies substantially in proportion to the engine temperature, they will maintain the thrust-face diameter substantially proportional to engine temperature.

In practice the elements 15, or where they are in one piece with the members 18, the entire structure, which may be a stamping, may be placed in a mold in which the piston is cast, and the piston is cast thereover. The structure is, however, such that while the elements 15 are securely embedded in the thrust faces, the members 18 are not interlocked with the piston; for, while as shown, the member 18 is cast in the wrist pin boss, the aluminum will shrink away from the member, and the rib 19 is not of sufficient thickness to secure any such interlocking. Moreover, the member 18 is on the inside and not on the outside of the wrist pin boss so that upon expansion of the piston in the regions of the bosses the members 19 will not be carried outwardly with those bosses.

The thrust faces can be ground cylindrically as distinguished from cam-grinding, and in the particular piston of the diameter described they can be fitted to the bore with a clearance of from .0035 inch to .004 inch, with the bottom of the skirt at the central thrust diameter fitted to the bore with a clearance of .002 inch to .0025 inch and with the head diameter .020 inch to .024 inch less than the skirt diameter. In practice, the entire piston can be first ground to a finish diameter with a .001 inch to a .0015 inch taper. The thrust face in the regions of the wings 8 can be ground cylindrically to the diameter described. The head can be ground to the diameter described. The skirt below the wings 8 is, however, ground oval with the minor axis along the boss diameter .008 inch less than that along the thrust diameter. In order to permit ready grinding and blending a groove 20 may be formed around the piston.

The piston, as usual, may have its wrist pin bosses connected with the head by webs 21 so as to provide a rigid construction in the wrist pin regions. The inside of the piston may, moreover, be provided with tapered ribs 22 in the center of the inside of the thrust face and extending from the upper part of the piston gradually downward. Where only one of the thrust faces is provided with an element 15, this thrust face may have the usual T-slot, shown in dotted lines at 23 in Figure 2, and which may terminate below the bottom of the skirt.

The skirt bottom may be provided with lugs 24 which serve to compensate for mold wear and which lugs may be machined to secure the proper weight. The skirt may be provided with a bottom groove 25 which may receive a ring. The upper part of the thrust faces may be thickened, as shown at 26, to embed the control element, and the thrust faces therebelow may be reduced as shown at 27 and pads 28 may be provided at the ends of the slots 10. The entire piston is so constructed that it may be cast in permanent molds with collapsible cores.

In the piston constructed as designed, the rigid elements 15 will serve to maintain the cylindrical curvature given to it by cylindrical grinding at all normal varying engine temperatures; for, upon heating, the bimetallic part will not operate as a thermostat, because of the rigidity of the element. During casting, of course, the aluminum will contract faster than the iron and may be under strain when the piston is cold; however, upon heating to the temperature encountered in operation, the temperature will rise only to a fraction of the solidification temperature of the aluminum, and, even so, the aluminum will give or flow before any thermostatic action can take place. The diameter of the thrust faces is also maintained, at least in accordance with the diameter of the cylinder, because the members 18 act to restrain diametrical expansion of the thrust faces. This is due to the fact that the members 18 are not only of steel, but, because of the construction of the upper parts of the thrust faces, they can flex relatively to the remainder of the skirt as the skirt tends to expand. The members 18 therefore act as tension members. These members 18 are not distorted during operation, for even though the piston may expand on the wrist pin axis, the members 18 will not be carried with them due to the fact that they are on the side and not on the outside of any expanding part of the piston. Furthermore, the slots 9, and even the parts 10, are of such a construction that the heat flow from the head of the piston will be toward the bottom of the skirt, so that the flow will not be preferential to the upper parts of the thrust faces. The piston is of course in engagement with the cylinder, but it is also subjected interiorly to the splashing of oil which will tend to keep it cool, and that is particularly true of the lower parts of the skirt.

This invention having thus been described, what is claimed is:

1. A trunk piston of the character described, comprising a head, a skirt, wrist pin bosses connected with said head and said skirt, said skirt having thrust faces separated from said head and constructed to flex at their upper parts relative to the head and the lower part of the skirt, and means including a pair of elements, each extending along and embedded circumferentially along the upper part of its thrust face and rigid transversely of the piston adapted to maintain the curvatures thereof substantially unchanged at varying engine temperatures.

2. A trunk piston of the character described, comprising a head, a skirt, wrist pin bosses connected with said head and said skirt, said skirt having thrust faces separated from said head and constructed to flex at their upper parts relative to the head and the lower part of the skirt, a pair of elements, each extending and embedded circumferentially along the upper part of its thrust face and rigid transversely of the piston adapted to maintain the curvatures thereof substantially unchanged at varying engine temperatures, and means connecting said elements adapted to maintain the diameters of the upper parts of said thrust faces substantially proportional to varying engine temperatures.

3. A trunk piston of the character described comprising a head, a skirt, wrist pin bosses connected with said head and said skirt, said skirt having thrust faces separated from said head and constructed to flex at their upper parts relative to the head and the lower part of the skirt, a pair of elements, each extending and embedded circumferentially along the upper part of its thrust face and rigid transversely of the piston adapted to maintain the curvatures thereof substantially unchanged at varying engine temperatures, and members connecting the corresponding ends of said elements adapted to maintain the diameters of the upper parts of said thrust faces substantially proportional to varying engine temperatures.

4. A trunk piston of the character described, comprising, a head, a skirt, wrist pin bosses connected with said head and said skirt, said skirt having thrust faces separated from said head and constructed to flex at their upper parts relative to the head and the lower part of the skirt, and means including a pair of elements, each having a coefficient of expansion materially less than that of the thrust faces and extending and embedded circumferentially along the upper parts thereof and rigid transversely of the piston adapted to maintain the curvatures thereof substantially unchanged at varying temperatures.

5. A trunk piston of the character described, comprising, a head, a skirt, wrist pin bosses connected with said head and said skirt, said skirt having thrust faces separated from said head and constructed to flex at their upper parts relative to the head and the lower part of the skirt, and a pair of arcuate elements, each having a coefficient of expansion materially less than that of the thrust faces and extending and embedded circumferentially along the upper parts thereof and rigid transversely of the piston adapted to maintain the curvature thereof substantially unchanged at varying temperatures.

6. A trunk piston of the character described, comprising, a head, a skirt, wrist pin bosses connected with said head and said skirt, said skirt having thrust faces separated from said head and constructed to flex at their upper parts relative to the head and the lower part of the skirt, a pair of elements, each having a coefficient of expansion materially less than that of the thrust faces and extending and embedded circumferentially along the upper parts thereof and rigid transversely of the piston adapted to maintain the curvature thereof substantially unchanged at varying temperatures, and members each having a coefficient of expansion corresponding to that of the cylinder adapted to maintain the diameters of the upper parts of said thrust faces substantially proportional to engine temperatures.

7. A trunk piston of the character described, comprising, a head, a skirt, wrist pin bosses connected with said head and said skirt, said skirt having thrust faces separated from said head and constructed to flex at their upper parts relative to the head and the lower part of the skirt, the upper parts of said thrust faces being formed to cylinder curvature, and means including a pair of elements, each extending and embedded circumferentially along the upper part of its thrust face and rigid transversely of the piston adapted to maintain the curvatures thereof substantially unchanged at varying engine temperatures.

8. A trunk piston of the character described, comprising, a head, a skirt, wrist pin bosses connected with said head and said skirt, said skirt having thrust faces separated from said head by part-circumferential slots and by slots extending downwardly from the terminals of said circumferential slots, a pair of elements, each having a coefficient of expansion materially less than that of the thrust faces, each element extending and embedded circumferentially along the upper part of its thrust face and rigid transversely of the piston adapted to maintain the curvatures thereof substantially unchanged at varying temperatures, and members having a coefficient of expansion corresponding to that of the cylinder and connecting the corresponding ends of the elements adapted to maintain the radius of the upper parts of said thrust faces substantially proportional to engine temperatures.

9. A trunk piston of the character described, comprising, a head, a skirt, wrist pin bosses connected with said head and said skirt, said skirt having thrust faces separated from said head by part-circumferential slots and by retrograde slots extending downwardly from the terminals of said circumferential slots and then laterally towards the middle of the respective thrust faces, a pair of elements, each having a coefficient of expansion materially less than that of the thrust faces and rigid transversely of the piston, each element extending and embedded circumferentially along the upper part of its thrust face adapted to maintain the curvatures thereof substantially unchanged at varying temperatures, and members having a coefficient of expansion corresponding to that of the cylinder and connecting the corresponding ends of the elements adapted to maintain the radius of the upper parts of said thrust faces substantially proportional to engine temperatures.

10. In a piston, a steel control structure, comprising, a pair of arcuate elements and members connecting the corresponding ends of said elements, said elements being designed, each for firm embedment circumferentially with a thrust face and each element being sufficiently rigid circumferentially to resist circumferential distortion when so embedded, and said members being designed to prevent radial expansion of the thrust faces.

11. A light-metal trunk piston of the character described, having a head, a skirt, wrist pin bosses connected with said head and said skirt, said skirt having one or both of its thrust faces separated from said head and constructed to flex at their upper parts relatively to the remainder thereof, one or both of said upper parts having embedded therein to extend circumferentially therealong a rigid element or elements sufficiently stiff to maintain the curvatures thereof substantially unchanged at varying engine temperatures.

12. A light-metal trunk piston of the character described, having a head, a skirt, wrist pin bosses connected with said head and said skirt, said skirt having one or both of its thrust faces separated from said head and constructed to flex at their upper parts relatively to the remainder thereof, one or both of said upper parts having embedded therein to extend circumferentially therealong a rigid element or elements sufficiently stiff to maintain the curvatures thereof substantially unchanged at varying engine temperatures, and tension members having a coefficient of thermal expansion less than that of the piston metal connecting the opposite skirt portions at their upper side corners, said tension elements being free of the piston metal so as to be unaffected by expansion thereof.

WILLIAM M. VENNER.
PERCY L. BOWSER.

REFERENCES CITED

The following references are of record in the file of this patent:

UNITED STATES PATENTS

| Number | Name | Date |
| --- | --- | --- |
| 1,730,120 | Jardine | Oct. 1, 1929 |
| 1,835,874 | Jardine et al. | Dec. 8, 1931 |
| 1,881,237 | Nelson | Oct. 4, 1932 |
| 2,083,533 | Long | June 8, 1937 |
| 2,090,799 | Long | Aug. 24, 1937 |
| 2,240,967 | Venner et al. | May 6, 1941 |